United States Patent [19]
Eddy

[11] 3,727,430
[45] Apr. 17, 1973

[54] CONSTANT VELOCITY UNIVERSAL JOINT

[75] Inventor: Robert T. Eddy, South Bend, Ind.

[73] Assignee: Reliance Electric Company, Mishawaka, Ind.

[22] Filed: May 24, 1971

[21] Appl. No.: 146,071

[52] U.S. Cl. ................................................64/21
[51] Int. Cl. ..............................................F16d 3/30
[58] Field of Search.....................................64/21, 8

[56] References Cited

UNITED STATES PATENTS

| | | | |
|---|---|---|---|
| 3,287,934 | 11/1966 | Asher | 64/21 |
| 3,368,370 | 2/1968 | Grauel | 64/21 |
| 3,603,111 | 9/1971 | Aucktor | 64/21 |

Primary Examiner—Kenneth W. Sprague
Attorney—Marmaduke A. Hobbs, Maurice W. Green and Kemon, Palmer and Estabrook

[57] ABSTRACT

A constant velocity, axially adjustable, universal joint having an outer race with straight, axially parallel grooves on its inner surface, and an inner race with straight, axially parallel grooves on its outer surface, balls seated in said grooves forming driving elements between the two races, and a retainer spaced from said inner race for retaining said balls in their respective grooves. The joint is designed primarily for use in a multiple cylinder pump or motor or hydrostatic transmission in which the outer race or the supporting structure therefor forms a wobble plate for driving pistons in the cylinders.

9 Claims, 4 Drawing Figures

PATENTED APR 17 1973 3,727,430

INVENTOR.
ROBERT T. EDDY
BY Hobbs & Green
ATTORNEYS

CONSTANT VELOCITY UNIVERSAL JOINT

Several types of universal joints transmit constant velocity or a velocity ratio of unity by means of a single joint, one example being the well known "Rzeppa" joint which utilizes a plurality of annularly arranged spaced balls mounted between outer and inner races and maintained in operating position by a retainer or cage through which a part of the force is transmitted between the driver and follower. The mechanical construction is such that the balls disposed between outer and inner races, transmitting the motion from the driver to the follower, always lie in a plane bisecting the angle between the center axis of the driver and follower, thus providing the velocity ratio of unity in this type of joint. In attempts to improve the application and transmission of forces between the outer and inner races and to minimize the tendency of the balls to become off-set from the bisecting plane, several of the well known constant velocity joints of the foregoing types have arcuate ball receiving grooves in the inner and outer races and/or grooves in the outer race intersecting the grooves of the inner race when the axes of the two races are parallel. The production of races with grooves of these types normally involves difficult and time consuming machining operations, and close tolerances in order to obtain satisfactory performance. It is therefore one of the principal objects of the present invention to provide a constant velocity universal joint which is simple and compact in construction, using ball grooves which are straight and parallel with the axes of the respective races, and hence economically machined, using standard machine tools and simple machining practices.

Another object of the invention is to provide a universal joint utilizing a plurality of annularly arranged, spaced balls, and embodying four basic components consisting of the inner and outer races, balls and a retainer, which can be easily fabricated and assembled in operating position, and which employs a simple and convenient way to entrap the balls in operating position within the races for transmitting the forces between the two races without applying a significant force component on the retainer.

Still another object of the invention is to provide a universal joint of the multiple ball type which permits axial movement between the inner and outer races for accurate adjustment of the drive and driven shafts, without adversely affecting the optimum operation of the joint, and which has a relatively high degree of angular movement.

A further object is to provide a universal joint of the aforesaid type, which is especially adapted for use in conjunction with a wobble plate of a multiple cylinder pump, wherein the wobble plate forms one part of the universal joint and is efficiently variable from zero to full pump output, and wherein the wobble plate may be either the rotatable or stationary element of the joint.

Additional objects and advantages of the invention will become apparent from the following description and accompanying drawing, wherein.

Figure 1:
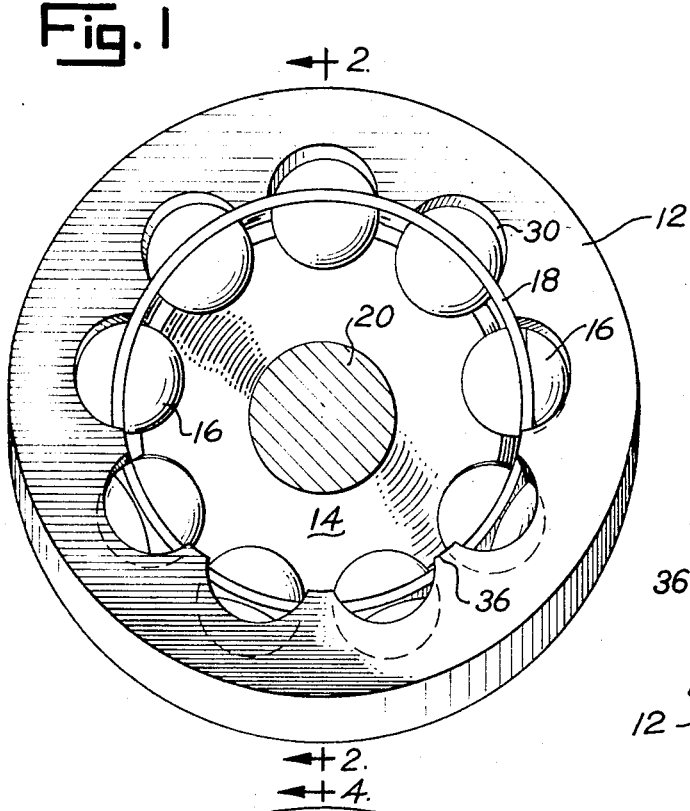
FIG. 1 is an elevational view of the universal joint embodying the present invention, showing a center shaft of the joint in section.

Referring more specifically to the drawings, the present constant velocity universal joint consists of three basic parts which are relatively easy to machine, assemble and maintain in optimum operating condition. The type of universal joint shown in the drawings is designed and intended primarily for use in a multiple cylinder pump, motor, or hydrostatic transmission in which a wobble plate controls the stroke of the pistons. For satisfactory operation in this type of use, the wobble plate must give long and dependable performance with little attention or without frequent service. While the universal joint is particularly adapted for the foregoing uses, it nevertheless involves a novel concept which can be embodied in and readily adapted to universal joints used for a variety of different purposes.

Figure 2:
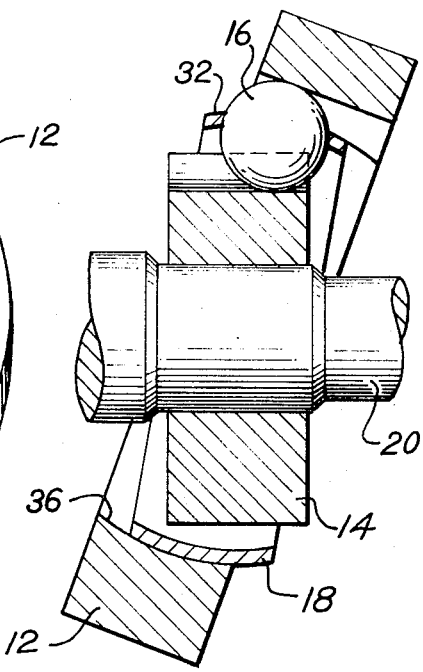
FIG. 2 is an axial cross sectional view of the joint shown in FIG. 1, the section being taken on line 2—2 of FIG. 1.
Figure 3:
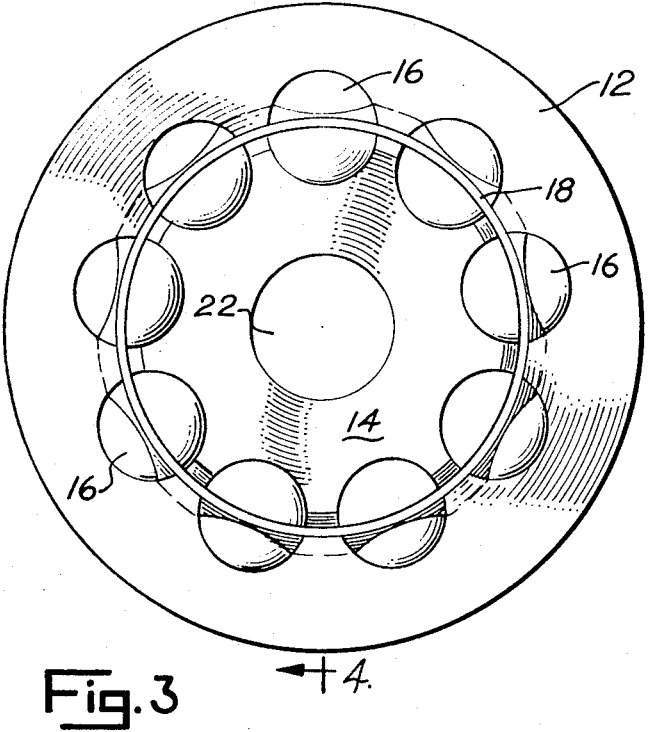
FIG. 3 is an elevational view of the universal joint shown in the preceding figures, illustrating the position of the parts when the axes of the two races are in alignment with one another.
Figure 4:
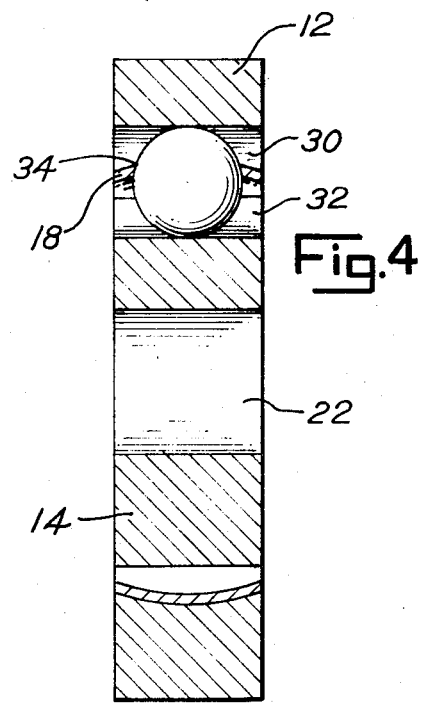
FIG. 4 is an axial cross sectional view of the universal joint taken on line 4—4 of FIG. 3.

The structure of the universal joint includes an outer member and race 12, an inner member and race 14, a plurality of balls 16, and a retainer 18. When the joint is used for a pump, motor or hydrostatic transmission, the outer member and race normally form the wobble plate, which is positioned at various angles such as that illustrated in FIG. 2, and the inner member and race are mounted on a shaft, such as that illustrated at numeral 20, extending through bore 22 in the center of the race. The outer and inner races are rotatable along with shaft 20, and variations in the stroke of the pistons are accomplished by moving the wobble plate and the outer member and race 12 to various angular positions with respect to the axis of shaft 20 and inner member and race 14. The balls are seated in grooves 30 and 32 in the outer and inner races, respectively, and these grooves are parallel with the axis of the respective race, and arcuate in cross section on a radius substantially the same as the radius of the balls. The grooves in the two races maintain the spacing between the balls and, when the outer race is positioned angularly, i.e., inclined with respect to the inner race, the grooves, except those at the point of maximum displacement, have a crossed relationship which retains the balls in the grooves in all locations except in the groove or grooves at the point of maximum displacement. Only two of the balls are normally in a position which would not be maintained within the grooves by the overlying, crossed relationship between two corresponding grooves of the outer and inner races. To prevent dislodgement or displacement of the balls in those grooves, the retainer 18 is utilized to maintain the two balls on the same plane as the balls entrapped in the crossed grooves. The retainer surface 32 is a segment of a sphere and contains a plurality of openings 34 for receiving the balls. The inner surface 36 of the outer race between grooves 30, is of a curvature corresponding to the spherical outer surface of the retainer, with the radius of both being the center of the retainer and outer race. The retainer thereby readily slides in an arcuate movement onto the corresponding curved surface of race 12, and thereafter easily moves to various angular positions as the outer and inner races are moved angularly with respect to one another. In the present joint, the balls and the center of the retainer always lie on a common plane positioned at one half the angle of the joint, thus maintaining constant velocity between the two races. The retainer essentially rides on the inner surface of the outer race, but is in spaced relation to the periphery of the inner race, thus permitting the two races to move easily and readily to various angular positions, with the plane of the balls assuming the position at one half the angle of the joint, as illustrated in FIG. 2. Since the retainer performs no function other than retaining the two opposed balls at the point of maximum displacement in proper operating position, only a relatively loose fit of the retainer in the outer race is required. The spacing of the retainer from the periphery of the inner race permits the adjustment of the inner and outer races axially relative to one another over a relatively wide range, without interference from the retainer and without interfering with the optimum performance of the joint.

In the construction and operation of the present universal joint, the balls are assembled in the retainer and axially aligned grooves of the outer race, with the balls and retainer being on a transverse plane at right angles to the axis of shaft 20. The inner race is then slid axially into the outer race until the two races and the retainer are on the same transverse plane, thereby placing the balls in the grooves of both the inner and outer races. As the joint is used, for example, in a multiple cylinder pump, motor, or a hydrostatic transmission, the outer race is tilted angularly as shaft 20 and the races rotate, and, if the shaft 20 is a drive shaft in a pump for example, the forces are transmitted from the shaft through the inner race to the balls, and thence to the outer race with the retainer transmitting little or none of the forces.

In view of the simplicity, particularly with respect to the straight axially parallel grooves in both the inner and outer races, machining of the races constitutes a relatively simple operation, and the four parts, consisting of the outer and inner races, the balls and retainer, can be readily assembled. Since the retainer contacts only the outer race and the inner race is spaced therefrom, optimum performance of the joint is obtained over extended periods of time with little or no service requirements. With the inner member and race 14 mounted on shaft 20 for rotational movement therewith, the outer race 12, which is driven through the balls, is readily adjustable to various angular positions with respect to the inner member and race, and the plane of the balls always assumes a position at half the angle between the inner and outer races. The foregoing construction provides a constant velocity universal joint and permits the races to be adjusted axially relative to one another, thus avoiding the necessity for close tolerances in the parts of the joint and pump or other mechanism in which the joint is used, and axial adjustment is permitted over a relatively wide range by the axial clearance between the retainer and the periphery of the inner race, and by the straight, axially parallel grooves in both the inner and outer races which are adapted to move axially relative to one another with the outer race and retainer moving together as a unit.

While only one embodiment of the present universal joint is described in detail herein, various changes and modifications may be made without departing from the scope of the invention.

I claim:

1. A constant velocity, axially adjustable universal joint comprising an outer, annular shaped race with straight, axially parallel, uniformly spaced grooves on its inner surface, an inner race with straight, axially parallel, uniformly spaced grooves equal in number to the grooves in said outer race on its outer surface, the periphery of said inner race being spaced inwardly from the inner surface of said outer race and the inner surface of said outer race between said grooves having a spherical curvature on the radius of the axis of the outer race, a ball in each of said grooves interconnecting the inner and outer races in driving relationship, and a ball retainer means having a row of holes corresponding to the number of grooves in said outer and inner races, said retainer means being spaced from said inner race and having a spherical outer periphery of substantially the same radius as the inner surface of said outer race between said grooves.

2. A universal joint as defined in claim 1 in which the periphery of the inner race between the spaced grooves is parallel with the axis of the race and of a smaller diameter than the internal diameter of said retainer.

3. A universal joint as defined in claim 1 in which said inner race includes a means for mounting said race on a rotatable shaft.

4. A universal joint as defined in claim 1 in which the curvature of the grooves of the inner and outer races is of substantially the same radius as the balls, and the diameter of the holes in said retainer is such that the balls fit relatively loosely therein when the inner and outer races are assembled in operative position.

5. A universal joint as defined in claim 1 in which said races contain nine ball-receiving grooves.

6. A universal joint as defined in claim 1, in which the marginal edge of said outer race forms a wobble plate member for a hydraulic motor or pump.

7. A universal joint as defined in claim 1 in which said inner race includes a means defining an axial hole for a rotatable shaft.

8. A universal joint as defined in claim 1 in which the outer race has a generally disc-shaped configuration.

9. A universal joint as defined in claim 1 in which the inner race is of a generally disc-shaped configuration.

* * * * *